United States Patent [19]

Komai

[11] Patent Number: 4,869,711
[45] Date of Patent: Sep. 26, 1989

[54] POWER TRANSMISSION BELT
[75] Inventor: Takahiko Komai, Takasago, Japan
[73] Assignee: Mitsuboshi Belting Ltd., Kobe, Japan
[21] Appl. No.: 265,003
[22] Filed: Oct. 31, 1988
[51] Int. Cl.$^4$ ............................................... F16G 5/08
[52] U.S. Cl. .................................................. 474/263
[58] Field of Search ............................ 474/261–265, 474/268, 249–251; 428/295, 293, 268, 365; 156/137–142

[56] References Cited

U.S. PATENT DOCUMENTS 3,987,684 10/1976 Fisher et al. ................... 474/263 X
4,509,938 4/1985 Woodland ..................... 474/263 X
4,571,230 2/1986 Woodland ........................ 474/264
4,634,413 1/1987 Hollaway, Jr. .................... 474/263
4,657,526 4/1987 Tangorra et al. ............... 474/263 X Primary Examiner—Thuy M. Bui
Attorney, Agent, or Firm—Wood, Dalton, Phillips, Mason & Rowe

[57] ABSTRACT

A power transmission belt having a compression section defined by a plurality of portions having different contents of transversely extending short fibers therein. In one form, the different portions of the compression section are separated by a bonding layer. In one form, where the difference between the fiber content of the respective layers is minimized, the bonding layer is omitted. A number of different configurations of the power transmission belt incorporating such different compression section portions is disclosed.

36 Claims, 1 Drawing Sheet

U.S. Patent  Sep. 26, 1989  4,869,711

POWER TRANSMISSION BELT

TECHNICAL FIELD

This invention relates to power transmission belts and in particular to power transmission belts formed of elastomeric material.

BACKGROUND ART

In one conventional form of power transmission belt, a plurality of longitudinally extending tensile cords are provided in a cushion rubber section thereof. The belt further defines an inner compression section conventionally formed of an elastomeric material, such as rubber.

In one form of such belt, short fibers are provided in the rubber of the cushion section.

It is further conventional to provide cover fabric on the outer surface of the belt and on the inner surface of the compression section of the belt.

By maintaining the side surfaces of the V-belt raw edge, a high friction coefficient with the confronting surfaces of the pulley groove is obtained. The provision of the transverse fibers in the compression section minimizes deformation of the belt in the driving operation as a result of the relatively large lateral pressure on the compressed part of the belt.

In one prior art construction, the compression layer is formed of an inner layer and an outer layer having different hardnesses. A problem has arisen, however, in such construction in that separation of the layers along their interfaces tends to occur after a relatively short use of the belt due to the deterioration of adhesion between the layers caused by heat generated in the driving operation and as a result of their relatively large lateral pressure acting on the compression section.

DISCLOSURE OF THE INVENTION

The present invention comprehends an improved power transmission belt overcoming the problems of the prior art as discussed above, in a novel and simple manner.

The power transmission belt of the present invention provides a silent running belt having a plurality of layers defining the cushion section constructed to avoid the problem of layer separation found in the prior art belts.

More specifically, the invention comprehends an improved power transmission belt including a cushion section having longitudinally extending tensile cords distributed therein, and a compression section formed of an elastomeric material and having an outer portion adjacent the cushion section and an inner portion inwardly of the outer portion, the outer portion having short fibers distributed therein and the inner portion having short fibers distributed therein, the parts by weight of the short fibers in the inner portion elastomeric material being less than the parts by weight of the short fibers in the outer portion elastomeric material.

In one embodiment, means are provided between the outer and inner portions of the compression section bonding the inner and outer portions to each other.

The belt may include an inner section overlying the cushion section formed of at least one layer of fabric, and in one embodiment, a tension section is provided inwardly of the cushion section which, in turn, is covered by a fabric layer.

In the illustrated embodiments, the cushion and compression sections define raw edge side surfaces of the belt.

The short fibers, in the illustrated embodiment, extend transversely of the compression section.

The short fibers are preferably provided in the range of approximately 30 to 50 parts by weight of the fibers to 100 parts by weight of the elastomeric material in the outer portion of the compression section.

The short fibers are preferably provided in the range of approximately 10 to 40 parts by weight of the short fibers to 100 parts by weight of the elastomeric material in the inner portion of the compression section.

In the illustrated embodiment, the elastomeric material of the compression section comprises rubber. The short fibers may comprise cotton fibers, nylon fibers, rayon fibers, etc., and may be woolly processed.

In the illustrated embodiment, the outer portion of the compression section has a hardness greater than the hardness of the inner portion of the compression section.

In the illustrated embodiment, the outer portion of the compression section has a hardness in the range of approximately 85–92 and the inner portion of the compression section has a hardness in the range of approximately 76–88.

In the preferred embodiment, the parts by weight of the short fibers in the inner portion of the compression section is at least 10 less than the parts by weight of the short fibers in the outer portion.

In the illustrated embodiment, the portion by weight of short fibers in the inner portion of the compression section is in the range of approximately 10–40 less than the parts by weight of the short fibers in the outer portion.

In the illustrated embodiment, the means for bonding the inner and outer portions to each other comprises a layer of bonding rubber having a thickness in the range of approximately 0.05 to 0.20 mm.

In the preferred embodiment, the bonding layer has a hardness less than that of the compression section portions and, illustratively, is in the range of approximately 62–80.

The bonding layer may have ceramic particles, such as ceramic powder, ceramic whiskers, etc., distributed therein.

In one embodiment, the boundary between the first and second portions of the compression section is wavy. In another embodiment, the boundary therebetween is flat.

In one embodiment, a tension section is provided outwardly of the cushion section. The tension section comprises an inner portion similar to the outer portion of the compression section and an outer portion similar to the inner portion of the compression section and, thus, defines, with the compression section and cushion section, a reversible belt.

The compression section may define ribs or cogs.

In one embodiment, a cord layer is provided between the cushion section and compression section. The cord layer, in the illustrated embodiment, comprises a layer of elastomeric material having a plurality of cords spaced longitudinally of the belt and extending transversely thereacross.

In one embodiment, a cord layer is disposed outwardly adjacent the cushion section. In one embodiment, the compression section further includes an innermost portion having short fibers distributed therein, the short fibers in the innermost portion being present in an amount less than that of the outer portion and inner portion of the compression section. In the illustrated embodiment, the short fibers in the inner most portion are prsent in the range of approximately 10 to 40 parts by weight.

The power transmission belt of the present invention is extremely simple and economical of construction, while yet providing the highly desirable features discussed above.

BRIEF DESCRIPTION OF THE DRAWING

Other features and advantages of the invention will be apparent from the following description taken in connection with the drawing wherein.

BEST MODE FOR CARRYING OUT THE INVENTION

Figure 1:
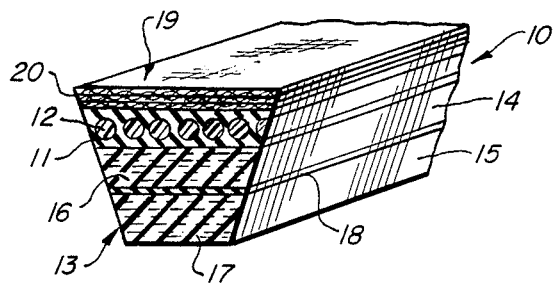
FIG. 1 is a fragmentary perspective view of a section of a power belt embodying the invention.

In the illustrative embodiment of the invention as disclosed in FIG. 1 of the drawing, a power transmission belt generally designated 10 is shown to include a cushion section 11 having longitudinally extending tensile cords 12 distributed therein. The belt further defines a compression section generally designated 13.

The compression section includes an outer portion 14 and an inner portion 15. The outer portion has a plurality of short fibers 16 distributed therein, and the inner portion has a plurality of short fibers 17 distributed therein. In the illustrated embodiment, the fibers 17 are similar to the fibers 16. The invention comprehends that the parts by weight of the fibers 17 in the inner portion 15 of the compression section be less than the parts by weight of the short fibers 16 in the outer portion 14 of the compression section.

Means are provided for bonding the outer portion 14 to the inner portion 15 in the belt 10. As shown in FIG. 1, the bonding means may comprise a layer 18 of bonding rubber.

The belt further includes an inner section generally designated 19 formed of at least one layer of fabric 20.

As seen in FIG. 1, the belt comprises a V-belt raw side edges, i.e. the side edges of the belt are free of cover fabric.

More specifically, the short fibers 16 and 17 extend transversely of the compression section. The short fibers 16 in the outer portion 14 of the compression section are present, in the illustrated embodiment, in the range of approximately 30 to 50 parts by weight of the short fibers to 100 parts by weight of the elastomeric material forming the outer portion 14. In the illustrated embodiment, the short fibers 17 in the inner portion of the compression section are present in the range of approximately 10 to 40 parts by weight of the short fibers to 100 parts by weight of the elastomeric material forming the inner portion 15.

In the illustrated embodiment, each of the cushion section and inner and outer portions of the compression section are formed of rubber. Illustratively, the short fibers may comprises cotton fibers, nylon fibers, rayon fibers, etc., and may be woolly processed or unprocessed fibers, as desired.

The hardness of the outer portion 14 may be greater than the hardness of the inner portion 15 of the compression section and, in the illustrated embodiment, the outer portion 14 has a hardness in the range of approximately 85-92 JIS Hardness, and the inner portion 15 has a hardness in the range of approximately 76-88 JIS Hardness.

Preferably, the parts by weight of the short fibers 16 in the outer portion 14 of the compression section is at least 10 less than the parts by weight of the short fibers 17 in the inner portion 15 thereof.

In the illustrated embodiment, the parts by weight of the short fibers 17 is in the range of approximately 10-40 less than the parts by weight of the short fibers 16 in the outer portion 14.

In the illustrated embodiment, the compression section portions 14 and 15 are bonded together by the bonding rubber layer 18, as discussed above. The bonding rubber layer illustratively may have a thickness in range of approximately 0.05 to 0.20 mm, and may be formed of a rubber material similar to that of the cushion section 11. Preferably, the bonding rubber has a hardness less than that of the compression section portions 14 and 15 rubber. Illustratively, the bonding layer rubber may have a hardness in the range of approximately 62-80 JIS.

The bonding rubber layer 18 may have ceramic particles distributed therein. Illustratively, the particles may comprise ceramic powder, ceramic whiskers, etc.

In the belt 10, the bonding rubber layer is substantially flat, as illustrated in FIG. 1.

In the illustrated embodiment, the cushion rubber is formed of any one or more of natural rubber, styrene butadiene rubber, chloroprene rubber, and nitrile butadiene rubber. Short fibers may be provided in the cushion section as desired, and such fibers may be raw fibers or fibers treated for improved adhesion with the cushion section rubber. Where short fibers are provided in the cushion section, they may be provided in the range of up to approximately 20 parts by weight of such fibers to 100 parts by weight of the cushion section rubber.

The tensile cords may be formed of conventional material, such as polyester fibers, nylon fibers, aromatic polyamide fibers, etc.

The fabric cover layer 20 may be formed of up to seven layers of conventional rubberized biased canvas. In the illustrated embodiment, the wefts have a relatively wide angle in the range of approximately 80° to 120°. Alternatively, the canvas may be woven with woolly finished curly nylon warps and conventional nylon wefts.

The compression section rubber preferably consists of one or more of natural rubber, chloroprene rubber, Hypalon rubber manufactured by duPont, epichlorohydrin rubber, and hydrogenated nitrile butadiene rubber.

It has been found that the inner portion having the indicated amount of embedded short fibers has a low friction coefficient, thereby reducing the noise level in the operation of the drive using the belt 10. The reduction in the amount of transverse fibers in the inner section 15 provides for improved bending flexibility of the belt and extended useful life. Thus, belt 10 exhibits both relatively low noise characteristics and long, trouble-free life resulting from the controlled flexibility of the compression section.

The specific amounts of short fibers in the compression section portions may be varied depending on the desired operating characteristics. Illustratively, where the drive has a relatively large load and a relatively large pulley diameter, the parts by weight of the short fibers 16 is preferably about 50 and the parts per weight of the short fibers 17 is preferably about 40. Where the drive has a relatively small load and a relatively small pulley diameter, the short fibers 16 may be present in the amount of approximately 30 parts by weight, and the short fibers 17 present in the amount of approximately 10 parts by weight.

Where a large load and a small pulley diameter are utilized in the drive, the short fibers 16 may be provided in parts by weight of approximately 50 and the short fibers 17 may be provided in parts by weight of approximately 20. Where the drive is one having a large load and a small pulley diameter under high ambient temperature conditions, it has been found desirable to provide the short fibers 16 in parts by weight of approximately 50 and the short fibers 17 in parts by weight of approximately 10.

The bonding rubber layer 18 is preferably relatively soft having a composition similar to that of the cushion rubber layer 11. Preferably, the hardness of the bonding rubber layer is in the range of approximately 62 to 80 JIS, and preferably lower than that of either of the compression section portions 14 and 15.

The selection of the rubber in forming different portions of the belt may be based on the necessary characteristics for the particular use thereof. Thus, where resistance to low temperature is desired, natural rubber is preferable. It has been found desirable to use natural rubber for the inner portion 15 of the compression section to provide desirable cold resistance. Chloroprene rubber has been found to be advantageous for use as the rubber material of compression section portion 14, wherein the larger content of short fibers is provided, so as to provide the desired high deformation resistance. It has been found advantageous to use either the natural rubber or chloroprene rubber for the bonding layer 18 to provide both high cold resistance and deformation resistance.

Figure 2:
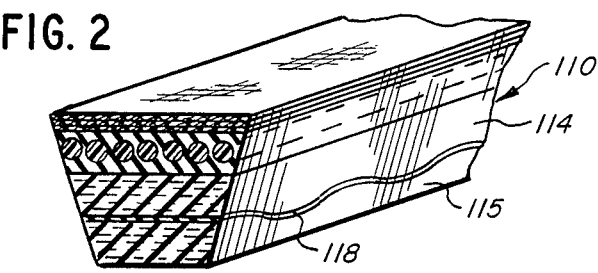
FIG. 2 is a perspective view of a fragmentary section of another form of power transmission belt embodying the invention.

Referring now to FIG. 2, a modified form of power transmission belt generally designated 110 is shown to comprise a power transmission belt similar to power transmission belt 10 but wherein the boundary between the outer compression section portion 114 and the inner compression section portion 115 is wavy and, thus, the bonding layer 118 finds a wavy configuration, as shown. In all other respects, the power transmission belt 110 is similar to and functions similar to the power transmission belt 10.

Figure 3:
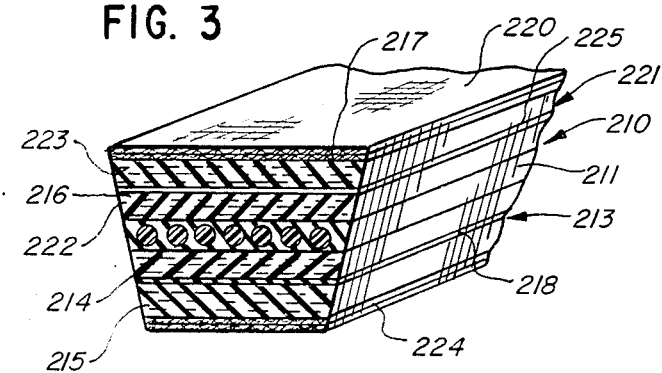
FIG. 3 is a perspective view of a fragmentary section of a further modified form of power transmission belt embodying the invention.
Figure 6:
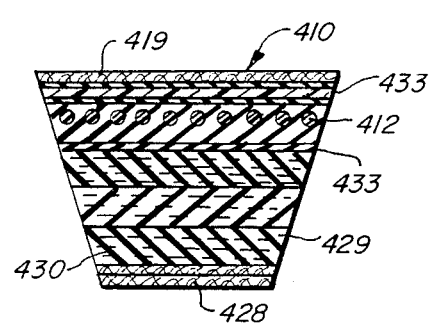
FIG. 6 is a perspective view of a fragmentary section of another form of power transmission belt embodying the invention.

A further modified form of modified power transmission belt generally designated 210 is shown in FIG. 3 to comprise a power transmission belt generally similar to power transmission V-belt 10, but wherein a tension section generally designated 221 is provided outwardly of the cushion section 211. The tension section comprises a configuration reversely similar to that of the compression section generally designated 213 and, thus, includes an inner portion 222 provided with transversely extending short fibers 216, and an outer portion 223 provided with transversely extending short fibers 217. The inner portion 222 is similar to outer portion 214 of the compression section 213, and the outer portion 223 is similar to the inner portion 215 of the compression section. Thus, the parts by weight of the short fibers 217 in the outer portion of the tension section is less than the parts by weight of the short fibers 216 in the inner portion of the tension section, and the more specific characteristics thereof similar to the characteristics discussed relative to the components of the compression section 13 of belt 10.

Belt 210 includes an outermost fabric layer portion 220 similar to fabric layer portion 20 of belt 10. In addition, the inner surface of the compression section may be provided with an underlying fabric layer 224. The inner fabric layer 224 may be similar to fabric layer 20 of belt 10 and the fabric layer 220 of belt 210.

As shown in FIG. 3, a bonding layer 225 may be provided between tension section portions 222 and 223, the characteristics of bonding layer 225 being similar to those described relative to bonding layer 18 in belt 10. A bonding layer 218 may be provided between the compression section portions 214 and 215, as in belt 10.

Thus, a plurality of belts 210 may be formed from a common flank by longitudinal separation of the respective belts therefrom, as each of the belts is reversely similar. Thus, low cost manufacture of the belt 210 may be effected by elimination of waste in the formation thereof from a common belt blank.

Figure 4:
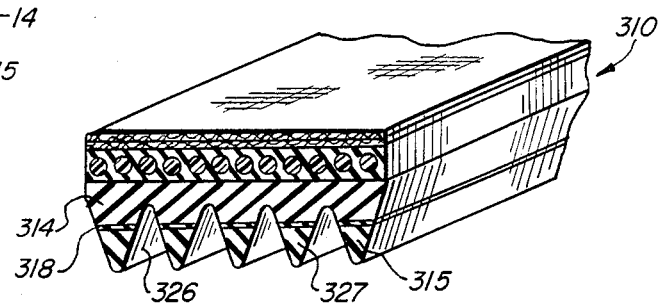
FIG. 4 is a perspective view of a fragmentary section of yet another form of power transmission belt embodying the invention.

A further modified form of power transmission belt generally designated 310 embodying the invention comprises a belt generally similar to power transmission belt 10, but wherein the compression section is provided with a plurality of longitudinally extending grooves 326 forming, in the compression section, a plurality of transversely spaced, longitudinally extending ribs 327. As shown in FIG. 4, the grooves may extend fully through the inner portion 315 of the compression section, the bonding layer 318 thereof, and at least partially through the outer portion 314 of the compression section. Belt 310 is adapted to be used with a multiple groove pulley, with each of the ribs 327 being received in a respective pulley groove thereof, and effectively providing the desirable low noise and low friction characteristics of the power transmission V-belt 10.

In all other respects, the belt 310 is similar to and functions in a manner similar to power transmission belt 10.

Figure 5:
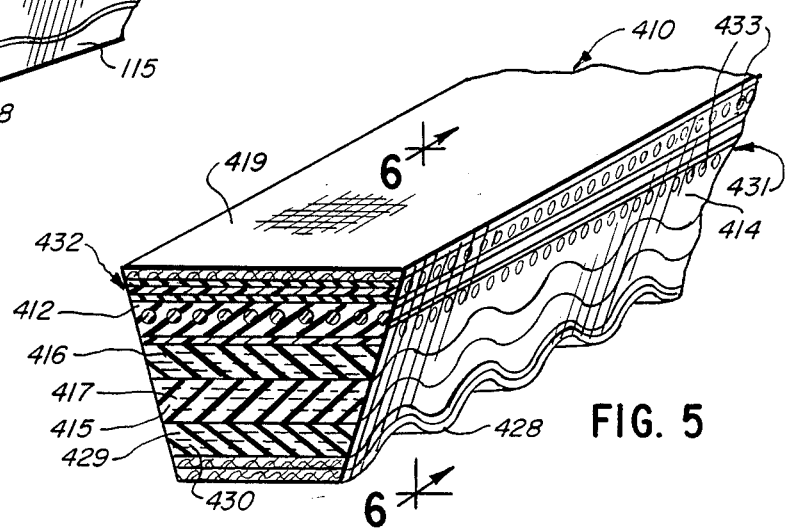
FIG. 5 is a perspective view of a fragmentary section of still another form of power transmission belt embodying the invention.

Another modified form of power transmission belt embodying the invention is shown in FIG. 5 to comprise a power transmission belt generally designated 410. Belt 410 comprises a cogged belt having a plurality of cogs 428 defining the inner surface thereof. Belt 410 further differs from power transmission belt 10 in the provision of a third, innermost compression section portion 429 inwardly of the inner portion 415 of the compression section. Innermost portion 429 is provided with transversely extending short fibers 430 similar to the short fibers 16 and 17 of belt 10. The parts by weight of the short fibers 430, in the innermost portion 429, is less than the parts by weight of the short fibers 417 in the inner portion 415, which, in turn, is less than the parts by weight of the short fibers 416 in the outer portion 414 of the compression section.

An inner cord fabric layer generally designated 431 is provided intermediate the cushion section 412 and the outer compression section portion 414. Between the cushion section 412 and the outer fabric layer 419 is a second cord fabric layer 432. Each of these layers comprises a plurality of transversely extending cords 433 providing increased rigidity in the transverse direction of the belt. The cords may be formed of polyester, nylon, aromatic polyamide, glass, carbon, etc., fibers.

The content of the short fibers 416 in the inner compression section portion 414 is preferably in the range of approximately 30 to 60 parts by weight to 100 parts by weight of the rubber, thereby providing improved rigidity in the transverse direction of the belt. The content of the short fibers 417 in the inner portion 415 of the compression section is preferably in the range of approximately 20 to 50 parts by weight to 100 parts by weight of the rubber. The contents of the short fibers 430, in the innermost portion 429 of the compression section, is preferably in the range of 10 to 40 parts by weight to 100 parts by weight of the rubber, thereby providing improved belt durability.

It is preferred that the difference in the content of the short fibers between the respective layers is less than 20 to permit bonding between the respective layers of the compression section without the provision of the bonding layers provided in the previously described embodiments.

The cord layers 431 and 432 preferably comprise layers of elastomeric material having a plurality of the cords 433 spaced longitudinally of the belt therein.

In a preferred embodiment, the short fiber 430 content in the innermost compression section portion 429 is in the range of 10 to 40 parts by weight to 100 parts by weight of the rubber. The content of the short fibers 417 in the inner portion 415 is in the range of approximately 20 to 50 parts by weight, and the content of the short fibers 416 in the outer portion 414 is preferably in the range of 30 to 60 parts by weight.

Other than as discussed above, power transmission belt 410 is similar to and functions in a manner similar to power transmission belt 10, as discussed above.

The foregoing disclosure of specific embodiments is illustrative of the inventive concepts comprehended by the invention.

I claim:

1. A power transmission belt comprising:
a cushion section having longitudinally extending tensile cords distributed therein; and
a compression section formed of an elastomeric material and having an outer portion adjacent said cushion section and an inner portion inwardly of said outer portion, said outer portion having short fibers distributed therein and said inner portion having short fibers distributed therein, the parts by weight of the short fibers in said inner portion elastomeric material being less than the parts by weight of the short fibers in said outer portion elastomeric material.

2. A power transmission belt comprising:
a cushion section having longitudinally extending tensile cords distributed therein;
a compression section formed of an elastomeric material and having an outer portion adjacent said cushion section and an inner portion inwardly of said outer portion, said outer portion having short fibers distributed therein and said inner portion having short fibers distributed therein, the parts by weight of the short fibers in said inner portion elastomeric material being less than the parts by weight of the short fibers in said outer portion elastomeric material; and
means between said outer and inner portions of the compression section for bonding said inner and outer portions to each other.

3. A power transmission belt comprising:
a cushion section having longitudinally extending tensile cords distributed therein;
a compression section formed of an elastomeric material and having an outer portion adjacent said cushion section and an inner portion inwardly of said outer portion, said outer portion having short fibers distributed therein and said inner portion having short fibers distributed therein, the parts by weight of the short fibers in said inner portion elastomeric material being less than the parts by weight of the short fibers in said outer portion elastomeric material; and
an inner section overlying said cushion section formed of at least one layer of fabric.

4. The power transmission belt of claims 1, 2, or 3 wherein said cushion and compression sections define raw edge side surfaces.

5. The power transmission belt of claims 1, 2, or 3 wherein said short fibers extend transversely of said compression section.

6. The power transmission belt of claims 1, 2, or 3 wherein said short fibers in said outer portion of the compression section are present in the range of approximately 30 to 50 parts by weight of said short fibers to 100 parts by weight of said elastomeric material thereof.

7. The power transmission belt of claims 1, 2, or 3 wherein said short fibers in said inner portion of the compression section are present in the range of approximately 10 to 40 parts by weight of said short fibers to 100 parts by weight of said elastomeric material thereof.

8. The power transmission belt of claims 1, 2, or 3 wherein said elastomeric material comprises rubber.

9. The power transmission belt of claims 1, 2, or 3 wherein said short fibers comprise cotton fibers.

10. The power transmission belt of claims 1, 2, or 3 wherein said short fibers comprise nylon fibers.

11. The power transmission belt of claims 1, 2, or 3 wherein said short fibers comprise rayon fibers.

12. The power transmission belt of claims 1, 2, or 3 wherein said short fibers comprise processed fibers.

13. The power transmission belt of claims 1, 2, or 3 wherein said outer portion of the compression section has a hardness greater than the hardness of said inner portion of the compression section.

14. The power transmission belt of claims 1, 2, or 3 wherein said outer portion of the compression section has a hardness in the range of approximately 85-92.

15. The power transmission belt of claims 1, 2, or 3 wherein said inner portion of the compression section has a hardness in the range of approximately 76-88.

16. The power transmission belt of claims 1, 2, or 3 wherein the parts by weight of the short fibers in said inner portion of the compression section are at least 10 less than the parts by weight of the short fibers in said outer portion.

17. The power transmission belt of claims 1, 2, or 3 wherein the parts by weight of the short fibers in said inner portion of the compression section are in the range of approximately 10-40 less the parts by weight of the short fibers in said outer portion.

18. The power transmission belt of claim 2 wherein said means for bonding said inner and outer portions to each other comprises a layer of bonding rubber.

19. The power transmission belt of claim 2 wherein said means for bonding said inner and outer portions to each other comprises a layer of bonding rubber having a thickness in the range of approximately 0.05 to 0.20 mm.

20. The power transmission belt of claim 2 wherein said means for bonding said inner and outer portions to each other comprises a layer formed of a material similar to that of said cushion section.

21. The power transmission belt of claim 2 wherein said means for bonding said inner and outer portions to each other comprises a layer formed of a material having a hardness less than that of said compression section portions.

22. The power transmission belt of claim 2 wherein said means for bonding said inner and outer portions to each other comprises a layer formed of a material having a hardness in the range of approximately 62–80 and less than that of said compression section portions.

23. The power transmission belt of claim 2 wherein said means for bonding said inner and outer portions to each other comprises a layer of bonding rubber having ceramic particles distributed therein.

24. The power transmission belt of claim 2 wherein the boundary between said first and second portions of the compression section is wavy.

25. The power transmission belt of claim 2 wherein the boundary between said first and second portions of the compression section is flat.

26. The power transmission belt of claims 1, 2, or 3 wherein a tension section is provided outwardly of said cushion section, said tension section comprising an inner portion similar to said outer portion of said compression section, and an outer portion similar to said inner portion of said compression section.

27. The power transmission belt of claims 1, 2, or 3 wherein a tension section is provided outwardly of said cushion section, said tension section comprising an inner portion similar to said outer portion of said compression section, and an outer portion similar to said inner portion of said compression section, and a fabric layer on said tension section.

28. The power transmission belt of claims 1, 2, or 3 wherein a tension section is provided outwardly of said cushion section, said tension section comprising an inner portion similar to said outer portion of said compression section, and an outer portion similar to said inner portion of said compression section, and a first fabric layer on the outer surface of said tension section and a second fabric layer on the inner surface of said compression section.

29. The power transmission belt of claims 1, 2, or 3 wherein said compression section defines ribs.

30. The power transmission belt of claims 1, 2, or 3 wherein said compression section defines cogs.

31. The power transmission belt of claims 1, 2, or 3 wherein a cord layer is provided between said cushion section and compression section, said cord layer comprising a layer of elastomeric material having a plurality of cords spaced longitudinally of the belt and extending transversely thereacross.

32. The power transmission belt of claims 1, 2, or 3 wherein a cord layer is provided outwardly adjacent said cushion section, said cord layer comprising a layer of elastomeric material having a plurality of cords spaced longitudinally of the belt and extending transversely thereacross.

33. The power transmission belt of claims 1, 2, or 3 wherein said compression section further includes an innermost portion having short fibers distributed therein, the parts by weight of the short fibers in said innermost portion elastomeric material being less than the parts by weight of the short fibers in said inner portion elastomeric material.

34. The power transmission belt of claims 1, 2, or 3 wherein said compression section further includes an innermost portion having short fibers distributed therein, the parts by weight of the short fibers in said innermost portion elastomeric material being less than the parts by weight of the short fibers in said inner portion elastomeric material, said short fibers in said innermost portion of the compression section being present in the range of approximately 10–40 parts by weight of said short fibers to 100 parts by weight of said elastomeric material thereof.

35. The power transmission belt of claims 1, 2, or 3 wherein said compression section further includes an innermost portion having short fibers distributed therein, the parts by weight of the short fibers in said innermost portion elastomeric material being less than the parts by weight of the short fibers in said inner portion elastomeric material, said short fibers in said outer portion of the compression section being present in the range of approximately 30–60 parts by weight of said short fibers to 100 parts by weight of said elastomeric material thereof.

36. The power transmission belt of claims 1, 2, or 3 wherein said compression section further includes an innermost portion having short fibers distributed therein, the parts by weight of the short fibers in said innermost portion elastomeric material being less than the parts by weight of the short fibers in said inner portion elastomeric material, said short fibers in said inner portion of the compression section being present in the range of approximately 20–50 parts by weight of said short fibers to 100 parts by weight of said elastomeric material thereof.

* * * * *